United States Patent [19]

Itoh et al.

[11] 3,814,955

[45] June 4, 1974

[54] CHARGE COUPLED SEMICONDUCTOR ELEMENT WITH NOISE CANCELLATION

[75] Inventors: Yokichi Itoh, Hachioji; Hideo Sunami, Kokubunji, both of Japan

[73] Assignee: Hitachi, Ltd., Chiyoda-ku, Japan

[22] Filed: June 5, 1972

[21] Appl. No.: 259,592

[30] Foreign Application Priority Data

June 4, 1971 Japan .............................. 46-38676

[52] U.S. Cl. .......... 307/304, 317/235 R, 317/235 G, 307/221 D, 328/165

[51] Int. Cl. ............................................ H01l 11/14

[58] Field of Search..... 317/235 G; 307/221 C, 304; 328/37, 165; 330/300, 69

[56] References Cited

UNITED STATES PATENTS

| | | | |
|---|---|---|---|
| 3,289,089 | 11/1966 | Linder | 328/165 |
| 3,463,974 | 8/1969 | Kelley et al. | 317/235 |
| 3,588,635 | 6/1971 | Medwin | 317/235 |
| 3,676,711 | 7/1972 | Ahrons | 317/235 |
| 3,678,347 | 7/1972 | Tulp et al. | 317/235 |

OTHER PUBLICATIONS

Electronics, "Charge Storage Lights the Way for Solid-State Image Sensors" by Weckler, May 1, 1967, pages 75–79.

Electronics "The New Concept for Memory & Imaging: Charge Coupling," pages 50–59, June 21, 1971.

IEEE Trans. Of Electron Devices," Charge-Coupled Imaging Devices" by Amelio et al., Vol. Ed. 18, No. 11, pages 986–992, Nov., 1971.

1971 IEEE International Solid-State Circuits Conf., "Charge-Coupled Digital Circuits" by Kosonocky et al., pages 162, 163, 203, Feb. 19, 1971.

Applied Physics Letters, "Charge-Coupled 8-Bit Shift Register" by Tompsett et al., Vol. 17, No. 3, pages 111–115, Aug. 1, 1970.

*Primary Examiner*—Jerry D. Craig
*Attorney, Agent, or Firm*—Craig & Antonelli

[57] ABSTRACT

A charge coupled semiconductor element comprises a main path into which charges, as signals, are injected to be shifted therethrough, and a by-path into which the charges, as signals, are not injected the outputs of said main path and said by-path being differentially detected as a signal.

6 Claims, 24 Drawing Figures

AXIS OF ORDINATE 0.1 V/div.
AXIS OF ABSCISSA 2.5 μsec/div.

CHARGE COUPLED SEMICONDUCTOR ELEMENT WITH NOISE CANCELLATION

BACKGROUND OF THE INVENTION

1. Field of the Invention

The present invention relates to a charge coupled semiconductor element, and more particularly to a charge coupled semiconductor element of an improved structure which can be made into an integrated circuit and which is low in noise.

2. Description of the Prior Art

Recently, a shift register of a novel structure has been developed in which a thin insulating film is provided on the surface of a semiconductor substrate, and a number of electrodes are further disposed on the insulating film. A description of this register was published in The Bell System Technical Journal, April, 1970, pp. 587 to 600, under the titles of "Charge Coupled Semiconductor Devices" and "Experimental Verification of the Charge Coupled Device Concept."

Since the element employs the phenomenon in which electric charges induced in or injected into the surface of the semiconductor substrate are moved along the substrate surface with voltages applied to the respective electrodes, such an element is called a charge coupled semiconductor element (or CCD element).

BRIEF DESCRIPTION OF THE DRAWINGS

FIG. 3(a) is a sectional view of the fundamental structure of the charge coupled semiconductor element and for explaining a detecting electrode portion for the shifted charges, while

FIGS. 5(a), (b) and (c) are diagrams for explaining that output signals contain large noise components in the prior-art charge coupled semiconductor element, in which FIG. 5(a) shows output signal wave forms, FIG. 5(b) a schematic view of a measuring circuit, and FIG. 5(c) a wave-form analysis diagram;

FIGS. 6(a) and 6(b) show the fundamental structure of a charge coupled semiconductor element, in which FIG. 6(a) is a plan view, while FIG. 6(b) is a sectional view taken along a line Y — Y' in FIG. 6(a);

FIGS. 7(a) and 7(b) illustrate the fundamental structure of the present invention in which outputs of a main path and a by-path provided separately therefrom are differentially derived to detect charges injected as signals, FIG. 7(a) being a plan view of such charge coupled semiconductor element, while FIG. 7(b) shows output signal wave forms in the case where the element is used;

FIGS. 11(a) and (b) show a structure in which an electrode is provided between the main path and the by-path in order to separate charges thereof from each other FIG. 11(a) being a plan view, while

FIG. 13(a) illustrates a method in which the charges are detected by a load MOS portion, and another charge coupled semiconductor element is thereby controlled, while FIG. 14(a) illustrates a method in which the shifted charges are detected by a region formed in a substrate surface portion under an insulating film and having the opposite conductivity type to that of a substrate, and another charge coupled semiconductor element is thereby controlled, while

Figure 1:
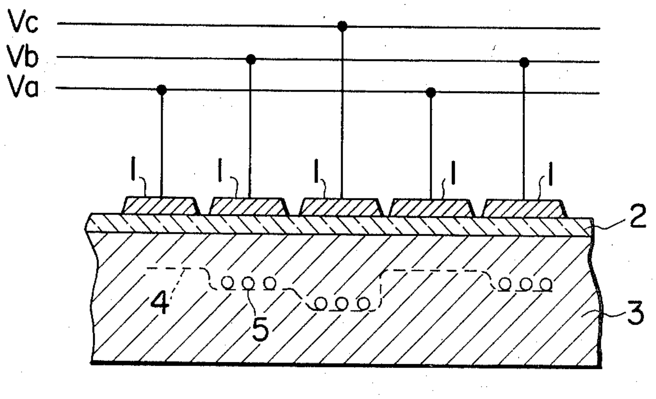
FIG. 1 is a sectional view of the fundamental structure of a prior-art charge coupled semiconductor element, for explaining the concept of shifting electric charges.
Figure 2:
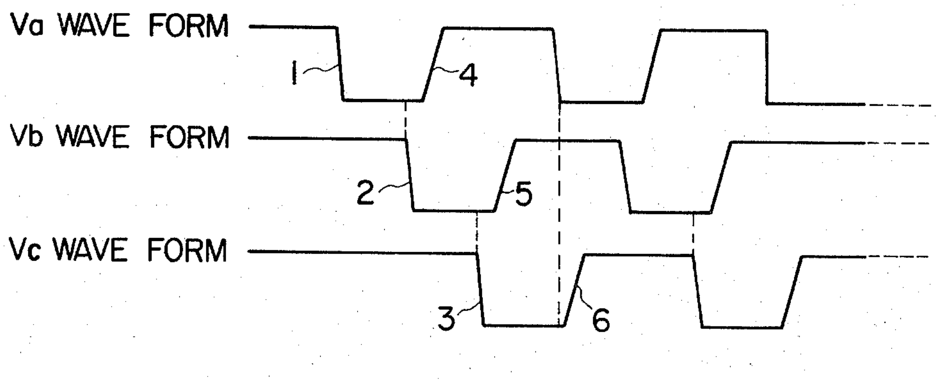
FIG. 2 shows an example of a group of three-phase shift pulses which are applied to shift electrodes of the charge coupled semiconductor element having the fundamental structure illustrated in FIG. 1.

Shown in FIG. 1 is a longitudinal section of a charge coupled semiconductor element, with the essential portions enlarged. At least two shift electrodes 1 are disposed in an array and are electrically insulated through a thin insulating film 2 on a semiconductor 3. The operative method of the element is described below. Using light irradiation, the avalanche phenomenon is employed, i.e., when a high electric field is applied externally, through a p-n junction, etc., electric charges 5, being minority carriers with respect to the substrate 3, are generated in the surface portion of the semiconductor substrate under the insulating film. Positive or negative voltages are applied to the shift electrodes 1, whereby a potential curve 4 for the charges as shown in FIG. 1 is formed within the substrate. The generated charges are shifted towards the lower electric potential. Next, in order to shift the charges under the adjacent shift electrode, the potential of the adjacent electrode is made even lower than at the preceding stage. In the case of a number of shift electrodes, however, when the potentials are lowered in succession, the semiconductor 3 or the insulating film 2 eventually suffers electrical breakdown. For this reason, in the charge coupled semiconductor element having the fundamental structure as illustrated in FIG. 1, three shift electrodes 1 are combined as one set, and three-phase pulses are periodically applied thereto. Thus, it is usually used in a region in which the electric potential exerted does not lead to electrical breakdown. An example of a group of shift pulses applied to the respective shift electrodes is shown in FIG. 2. It has been found that charges are also shifted in the same direction with a group of two-phase pulses, e.g., by varying the thickness of the insulating film under the electrodes (refer, for example, to IEEE ISSCC, Collection of Preliminary Manuscripts for Lectures in spring, 1971, pp. 158 to 167).

Figure 3A:
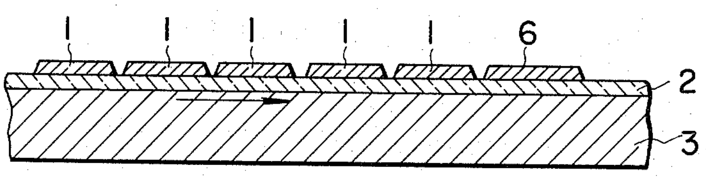
Figure 3B:
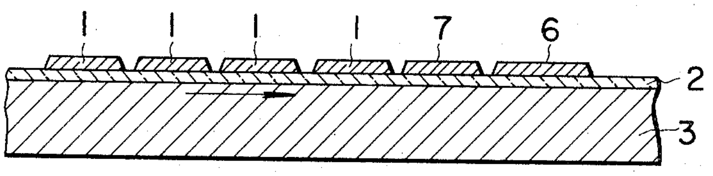
FIG. 3(b) is a view for explaining the case where a gate electrode is provided in the element in FIG. 3(a)
Figure 4A:
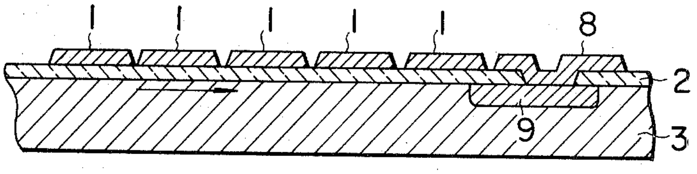
FIG. 4(a) and (b) are views for explaining a detecting electrode portion according to which a region having the opposite conductivity type to that of a substrate is provided, thereby detecting the shifted charges.
Figure 4B:
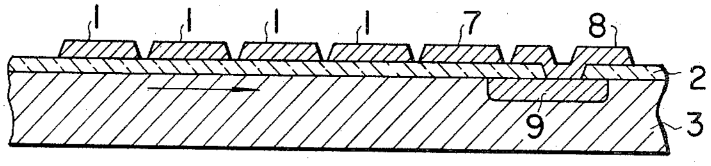

Examples of means to detect the charges thus shifted are illustrated in FIGS. 3(a) and (b) and FIGS. 4(a) and (b). FIGS. 3(a) and 3(b) show a system in which the charges having been shifted in the direction of the arrow are detected by utilizing the phenomenon that the capacitance and the electric potential between a detecting electrode 6 and the semiconductor 3 vary when the charges are shifted under the detecting electrode 6. FIGS. 4(a) and 4(b) show a system in which a p-n junction between a region 9 of a conductivity type opposite to that of the substrate and the substrate serves as detecting means, the p-n junction is reverse-biased through an electrode 8 being electrically connected to the region 9 opposite in the conductivity type to the substrate, and the charges which have been shifted are collected at the p-n junction. In these structures, it is also possible that an output gate electrode 7 may be provided between the charge detecting electrode 6 or 8 and the charge shifting electrode 1, so as to serve as a gate for the shifted charges.

Figure 5A:
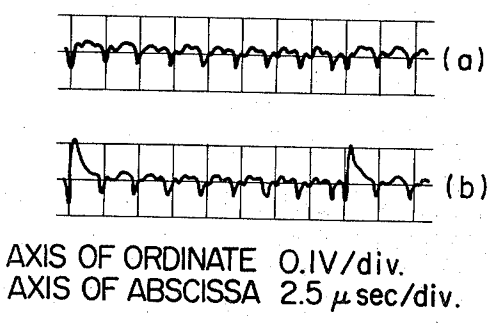
Figure 5B:
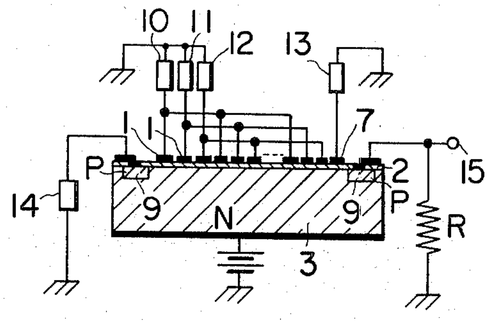

With either of the charge detecting means, the shift electrodes 1 and the output gate electrode 7 are capacitively coupled with the detecting electrode 6 or 8 through the insulating film and a depletion layer under the electrode or a depletion layer of the p-n junction. There are, accordingly, detected noises due to induction of a group of shift pulses and a gate pulse which are respectively applied to the shift electrodes 1 and the output gate electrode 7. The steeper the rise and fall of the group of the applied pulses, the greater the induction. If the induced noise components become large, discrimination between them and signals based on the shifted charges becomes difficult. As an example, output voltage wave forms of an 8-bit shift register are shown in FIGS. 5(a)—(a) and 5(a)-(b). FIG. 5(a)—(a) depicts the output voltage wave form in the case where the charges as the signals are not injected, while FIG. 5(a)-(b) shows the output voltage wave form in the case where the charges as signals are injected. The wave form shown in FIG. 5(a)—(a) consists of the noises due to the induction of the shift pulses, the output gate pulse, etc. Shown in FIG. 5(a-)-(b) is the voltage wave form in which the induced noises and the signals are superposed.

FIG. 5(b) illustrates the circuitry of a prior-art charge coupled semiconductor element used for examining the wave forms in FIG. 5(a). Referring to the figure, numeral 3 indicates an *n*-type silicon substrate of a specific resistance of 10Ωcm. Within one surface of the substrate, *p*-type layers 9 are provided by the diffusion of boron. An $SiO_2$ film 2 being 1,200 A thick is formed on the surface of the substrate 3, and shift electrodes 1, as well as a gate electrode 7, are formed on the surface thereof by deposition of aluminum. To these electrodes, there are respectively connected pulse sources 10, 11 and 12 for generating shift pulses Va, Vb and Vc and a gate pulse source 13 for generating gate pulses. An input signal source 14 is connected to one of the p-type impurity diffused layer 9, while an output signal terminal 15 is connected to the other layer 9.

Charges serving as noise are induced by bias voltages which are applied to the shift electrodes 1 and the output gate electrode 7.

The device in FIG. 5(b) comprises 24 shift electrodes in order to operate as an 8-bit shift register.

The results in FIG. 5(a) are data in the case where the shift pulses having a shift pulse voltage (Va, Vb or Vc) of −30V, a rise time of 200 n sec and a fall time of 500 n sec were applied to the shift electrodes (the dimensions of each shift electrode being $50\mu \times 500\mu$).

Figure 5C:
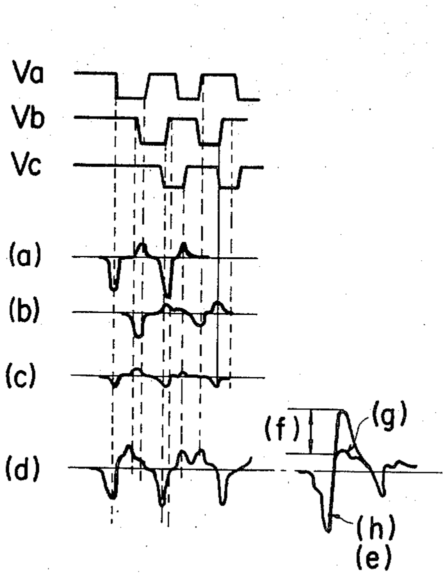

FIG. 5(c) is a diagram for qualitatively illustrating the state under which noise signals are built up in the detecting electrode by the moving pulses Va, Vb and Vc. In the diagram, reference characters Va, Vb and Vc designate wave forms of the three-phase shift pulses. (a), (b) and (c) indicate the noise signals induced by the Va, Vb and Vc pulses, respectively, while (d) is the composite noise signal of noise signals (a), (b) and (c). The reason why the noise (a) due to the pulse Vc has a large absolute value is that, since the shift electrodes to which the pulses Vc are applied are closer to the detecting electrode (*p*-type diffused region 9) as compared with the other shift electrodes to which the other pulses are applied, the capacitances between them are larger, resulting in a greater absolute value of the particular noise. (e) represents the compositing of a signal and a gate pulse. (g) shows the above-stated composite noise, while (f) the signal component superposed on the composite noise. (h) shows a noise component due to the gate pulse, which component has a larger absolute value as compared with the signal component because a gate pulse voltage Vg is larger in comparison with Va, Vb and Vc and because the gate electrode is close to the detecting electrode, so that the capacitance between them is larger than those between any shift electrodes and the detecting electrode.

Noises appearing at the output terminal of the charge coupled semiconductor element are generated by the foregoing shift pulse and gate pulse voltages, and in addition, they are generated within a depletion layer in the semiconductor substrate, at the interface part between the semiconductor substrate and the insulator film, etc. by the creation and recombination phenomena. Charges(serving as noises) produced within the depletion layer are collected at the substrate surface directly under the insulating film of the shift electrodes 1 and the gate electrode 7, and are mixed with charges injected as signals, with the result that the signal-to-noise ratio is deteriorated. The charges serving as noises increase with the passage of time, and reach a charge density equilibrium state at the applied bias voltage of the particular electrode. The noise output of this sort is therefore larger in the charge coupled semiconductor element, as the shift speed is lower and as the shift distance is longer.

SUMMARY OF THE INVENTION

It is, accordingly, an object of the present invention to provide a new structure of the charge coupled semiconductor element, which eliminates noise components due to induction of pulses applied to the shift electrodes 1 and the output gate electrode 7 and noise components due to charges generated by the creation and recombination phenomena.

In order to accomplish the above-mentioned object, the present invention consists of a charge coupled semiconductor element comprising a main path into which charges as signals are injected to be shifted therethrough, and a by-path into which the charges as signals are not injected, the outputs of said main path said by-path being differentially detected as a signal.

If the by-path is substantially equal to the main path in area and in shift distance, charges produced by the creation and recombination phenomena of substantially the same amount as in the main path and leading to noise are shifted in the by-path. For this reason, if the outputs of the main path and the by-path are differentially detected, the noise components of the respective paths are cancelled from each other, and only the signal components is detected. On the other hand, the noise components due to induction of shift pulses and gate pulses can be similarly cancelled. The induction from the shift electrodes 1 and the output gate electrode 7 in proximity to the detecting electrode 6 or 8 influences the induced noise components more greatly, since the capacitance between such electrodes and the detecting electrode 6 or 8 are larger as they are closer to the detecting electrode. The induction is therefore reduced remarkably with only one electrode closest to the detecting electrode 6 or 8, and the object of the present invention can be satisfactorily attained with only the closest electrode in some cases.

The simplest example for differentially detecting the outputs to remove the noise components from the output signal is a method in which the output terminal of the main path and that of the by-path are respectively used as external output terminals. Another example is to utilize a differential amplifier.

DESCRIPTION OF THE PREFERRED EMBODIMENTS

Figure 6A:
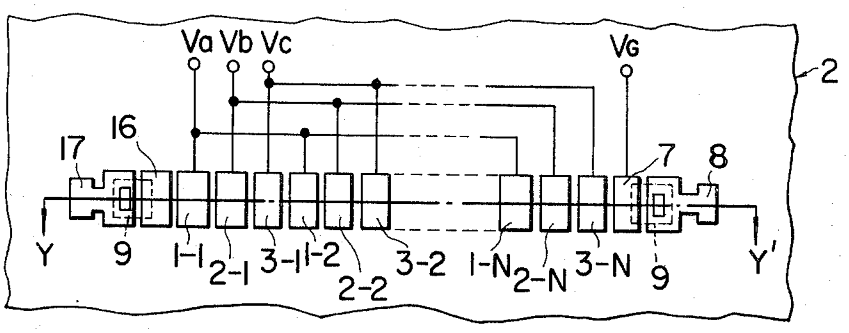
Figure 6B:
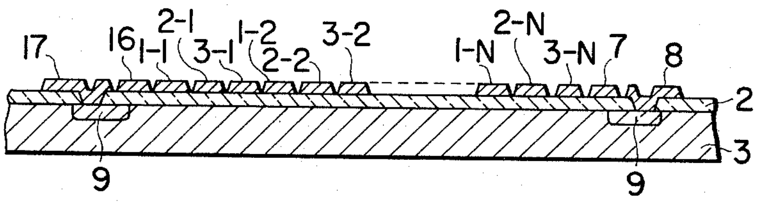

The present invention will be described in detail hereunder in connection with the preferred embodiments. For convenience sake in explanation, the fundamental structure of a prior-art charge coupled semiconductor element is shown in FIGS. 6(a) and 6(b). FIG. 6(a) is a plan view of a prior-art element, while FIG. 6(b) is a sectional view taken along an axis Y—Y' thereof. Regions 9 having a conductivity type opposite to that of a substrate 3 are provided below an insulating film 2, and are shown by dotted lines in order to make their positions definite. Although, in the figures, a construction owing to a p-n junction is used for injecting electric charges which become signals, all the known methods such as the foregoing avalanche phenomenon and light irradiation can also be employed. The charges injected into the region 9 opposite in conductivity type to the substrate from an input electrode 17 in resistive contact therewith are controlled by means of an output gate electrode 7 for the interface between the semiconductor 3 and the insulating film 2 under shift electrodes 1-1, 2-1, 3-1, 1-2, . . . . , 1-N, 2-N and 3-N by controlling an input gate electrode 16. They are derived in the form of the signals by an output detecting electrode 8. In the fundamental structure, three-phase shift pulses are used as stated previously and, by way of example, the pulses Va in FIG. 2 are simultaneously applied to the shift electrodes 1-1, 1-2, . . . 1-N, the pulses Vb are simultaneously applied to 2-1, 2-2, . . . 2-N and the pulses Vc are simultaneously applied to 3-1, 3-2, . . . 3-N.

Although the method of driving the charge coupled semiconductor element with the three-phase pulses has been referred to herein, the case of driving it with two phase pulses as in the previous description is quite similarly applicable to the present invention. Although a method for connecting the shift electrodes to one another is not illustrated in the figures, some methods are applicable to the connection. For example, there can be used the diffusion resistance which is widely employed in integrated circuits or so-called two-layer wiring in which an insulating film is superposed on the electrodes to connect the electrodes thereon, in order that the shift electrode groups applied with the pulses of the mutually different phases and their electrode lead-out portions may be prevented from being contacted.

Figure 7A:
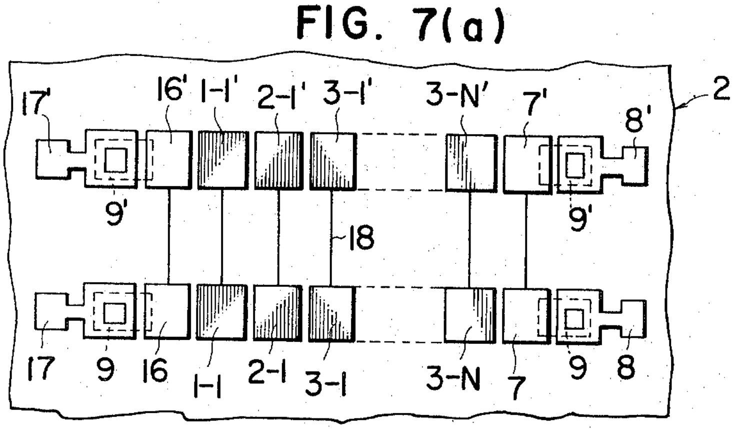

FIG. 7(a) shows in plan the structure of the charge coupled semiconductor element of the present invention, which has a main path into which charges as signals are injected, and a by-path into which the charges as signals are not injected. Electrodes corresponding to the respective electrodes shown in FIG. 6 are provided, and the respectively corresponding electrodes are electrically connected by connecting means 18.

FIG. 7(a) shows the concept of the electrical connection by connecting means 18, and the positional relation of the rectilinear wiring need not be that as shown in the figure. Among the electrodes, the electrode 17 with the charges injected thereinto as the signals and the corresponding electrode 17' in the by-path, and the electrodes 8 and 8' for examining signals in the main path and the by-path are not connected to each other, respectively. The charges, as the signals, are injected into the electrode 17, and the output is detected in the form of the difference between signals of the output detecting electrode 8 of the main path and the output detecting electrode 8' of the by-path (for example, only the signal output appears between the electrodes 8 and 8').

Figure 7B:
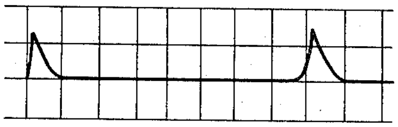

FIG. 7(b) illustrates output signals in the case where the input signals are shifted by means of the charge coupled semiconductor element of the novel structure shown in FIG. 7(a), and where the output signals are derived in the form of the differences between output signals of the respective paths. The pulse voltages, the number of the shift electrodes, and the other conditions are the same as in FIGS. 5(a) and (b) and their explanation.

When FIG. 7(b) is compared with FIG. 5(a), it is understood that, according to the present invention, the noise component can be removed from the output by substantially 100 percent.

Figure 8:
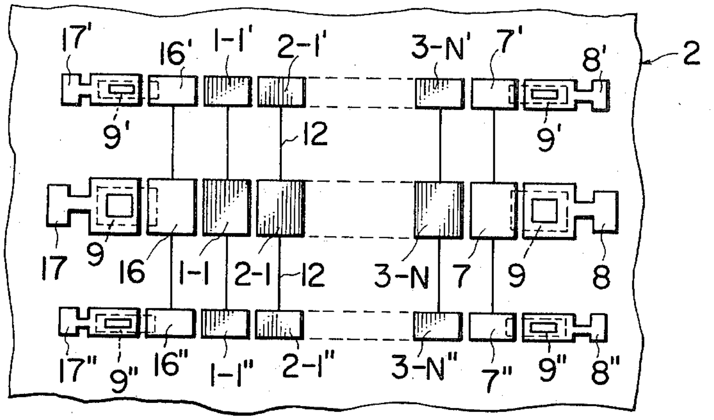
FIG. 8 is an explanatory view, in plan, of another aspect of performance of the present invention in which electrodes of the by-path are provided in divided manner.

Although, in FIG. 7(a), the by-path is provided along one side of the main path, the connecting portions 18 between the respectively corresponding electrodes represent the concept of the connection as has already been stated above, and the object of the present invention can be accomplished even if the main path and the by-path are disposed in a manner to be kept apart from each other. At that time, in order to equalize the quantities of charges serving as the noise components as are produced under the shift electrodes 1 (1') and the gate electrodes 16 (16') and 7 (7'), it is desirable to make the capacitances of these electrodes equal with respect to the detecting electrodes. If the insulators under the electrodes of the main path and the by-path are of the same material, this object is attained by equalizing the areas of the electrodes, and the by-path can be divided into at least two parts as illustrated in FIG. 8. Even in the case where an insulator different from that of the main path is used for the by-path, the areas of the electrodes and the thicknesses of the insulating films may be selected so as to make the capacitances equal. If, for example, an alumina film, having a dielectric constant 2.5 times larger than that of a silicon dioxide film used for the main path, is used for the by-path each area of the by-path electrodes on the alumina film can be reduced to 1/2.5 when making the thicknesses of both the films equal.

In the case where the by-path (at least one by-path part) is formed with electrodes of the same number as, or of a multiple, of, the number of those of the main path, it is necessary to select the areas of the respective electrodes of the by-path to predetermined values with the intention of differentially removing the charges of both the type produced by the induction of the shift pulses and the output gate pulses and by the creation and recombination phenomena under the respective electrodes. In case where the noise components due to the induction of the shift pulses and the output gate pulses account for the principal part of the entire noise, for example, in case where the charges injected by the signals are shifted earlier than the time at which the noise charges due to the surface recombination are induced, the object is substantially attained in such a way that, as shown in FIG. 9(a), only the last three shift electrodes 1-N′, 2-N′, 3-N′ and the output gate electrode 7′ are provided as the by-path.

Figure 9A:
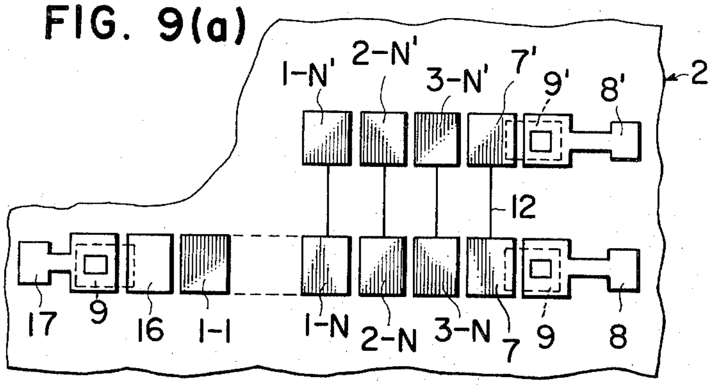
FIGS. 9(a) and (b) illustrate structures in which the by-path does not have the same number of electrodes as or more electrodes than in the main path, but it has electrodes corresponding to some of electrodes of the main path.

When the 8-bit shift register in FIGS. 5(a) and (b) was made with the construction of FIG. 9(a), noise components contained in the output signals in the prior-art element could be removed by almost 95 percent. Further, only with the output gate electrode 7′ and the shift electrode 3-N′ being closest to the detecting portion 8′, the objects of the invention can be attained in a substantially similar manner. Yet, further, in the case where the influence of the output gate pulses is greater than that of the shift pulses, the object can be attained only with the output gate electrode 7′ and the detecting portion 8′ as illustrated in FIG. 9(b).

Figure 9B:
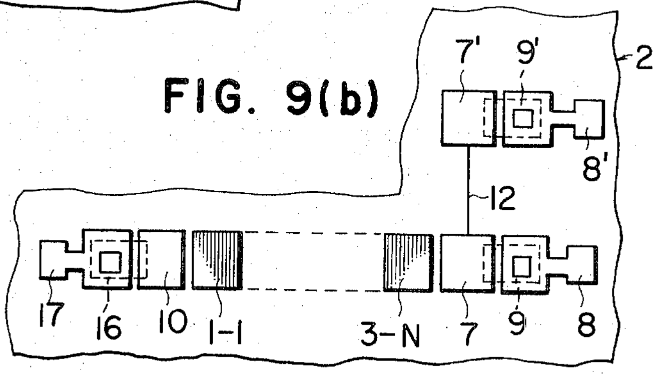

In this case, when noise components contained in the output signals are removed with the construction of FIG. 9(b), the percentage of removal reaches approximately 50 percent.

It is, as has been described with reference to FIGS. 7(a) and (b) and 8 that the object of the present invention is attained even if the electrodes are divided or formed apart in the structures in FIGS. 9(a) and (b).

Figure 10:
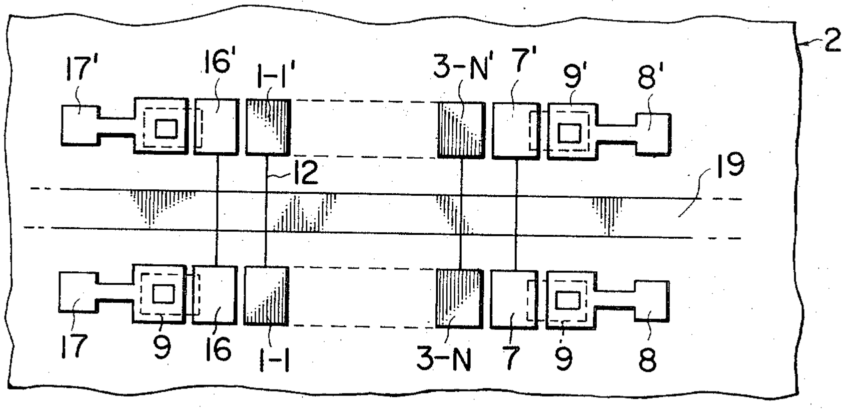
FIG. 10 shows a structure in which an insulating film is partially thickened in order to separate charges of the main path and the by-path from each other.

When the main path and the by-path are close to each other and the connecting portions 18 between them are short, charges flow from the main path into the by-path or vice versa through the interface portion between the semiconductor 3 and the insulating film 2 located under the connecting portions 18 between the main path and the by-path. This considerably attenuates the output signal component, resulting in a lowering of the sensitivity. In order to avoid this, so as to prevent the charges of the main path and the by-path from flowing into each other, it is necessary that the surface of the substrate, under the connecting portions 18 between the main path and the by-path has a high impurity concentration of the majority carrier, which serves as a storage region for the carrier. This can be solved such that, as shown in FIG. 10, the insulating film is thickened at a part 19 to thereby increase the threshold voltage. In addition, the main path and the by-path can be brought still closer to each other; a suitable insulating film is provided between the main path and the by-path to thereby form a separating zone for the charges of the main path and the by-path. For example, it is possible to constitute the insulating film of the main path and the by-path using $SiO_2$ and that of the interval zone of the main path and the by-path using $Al_2O_3$.

Since $SiO_2$, $Al_2O_3$, $Si_3N_4$, glass containing phosphorus and aluminum, etc. are generally utilized for the insulating film of the charge coupled semiconductor element, the separating zone can be provided in an appropriate combination of the films of these materials.

Figure 11A:
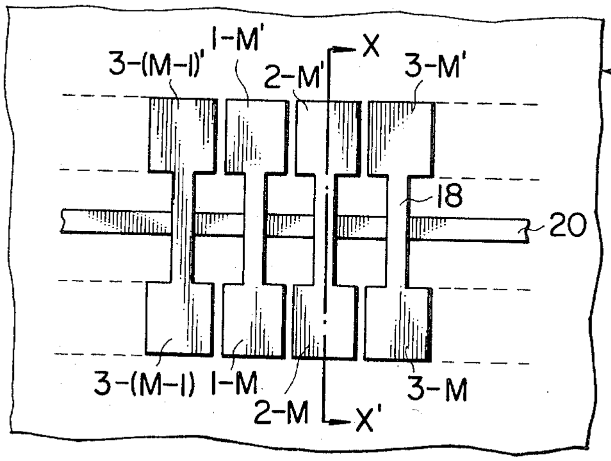
Figure 11B:
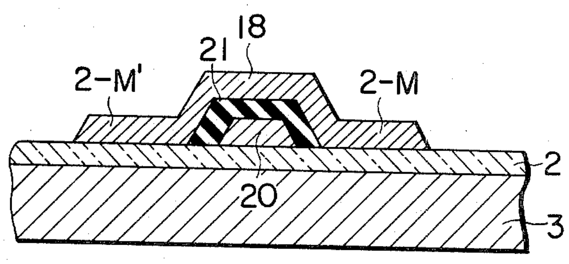
FIG. 11(b) is a sectional view taken along a line X — X' in FIG. 11(a)

If shift pulses and output and input gate pulses are used, which are so large that they cannot be separated by thickening the insulating film or by the use of different kinds of insulating films, an electrode 20 is provided between the main path and the by-path as shown in FIGS. 11(a) and (b); the connecting portions 18 between the main path and the by-path are formed through an insulating film 21 as shown in FIG. 11(b), and a bias voltage is applied to the electrode 20. Thus, the interface under the electrode 20 is made the storage region, which serves as the separating zone for the charges of the main path and the by-path. FIG. 11(a) shows the connected state of the corresponding electrodes between the main path and the by-path, while FIG. 11(b) a sectional view taken along a part X—X′ thereof.

The separating method in FIG. 10 in which the insulating film is partially thickened, the separating method in which suitable insulating films are selected, and the separating method in FIGS. 11(a) and 11(b) in which the electrode is formed between the main path and the by-path and the bias voltage is applied thereto are all applicable to the structures suggested in FIGS. 7(a) and (b), 8 and 9(a) and (b).

Figure 12:
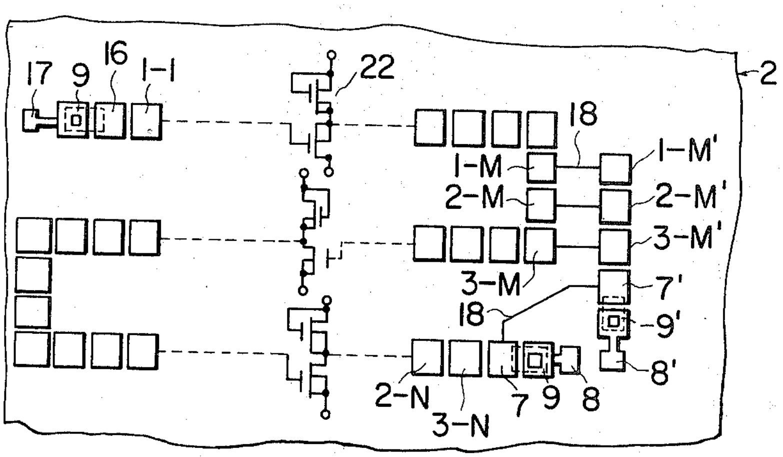
FIG. 12 illustrates a structure in which, to correspondingly connect electrodes of the main path and the by-path, they are not caused to correspond from one being the closest to an output detecting end, but they are led out halfway for the correspondence.

In connecting the corresponding electrodes between the main path and the by-path in the foregoing structures, it is not necessary to place the electrodes closer to the detecting electrode 8 of the main path. When the same pulses are applied, the corresponding electrodes 1-M, 2-M, 3-M, etc. are selected halfway in the main path as illustrated in FIG. 12, and they can be used as the by-path. This is applicable to all the structures having been thus far described. In FIG. 12, there are shown parts 22 which subject the charges to shaping or amplification halfway. They are effective for the charge coupled semiconductor element which has a shift electrode section, as long as the charges injected as signals disappear or cannot be discriminated without such means.

In this case, if the parts 22 are formed in a manner to be assembled into an identical surface of the semiconductor substrate, the whole device in FIG. 12 can be made into an integrated circuit.

Figure 13A:
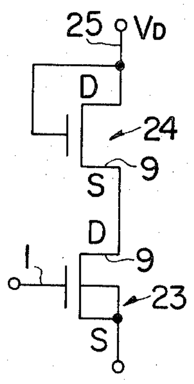
Figure 13B:
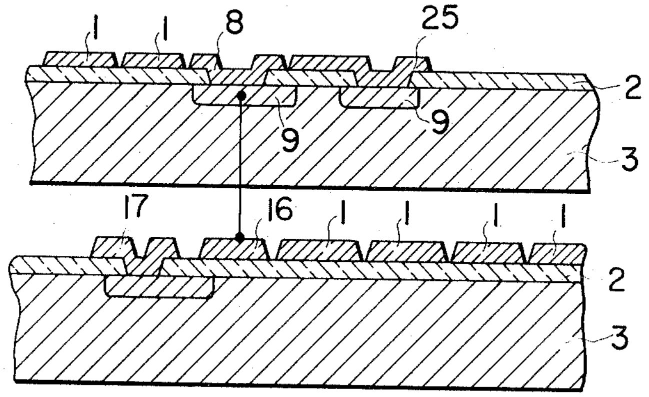
FIG. 13(b) shows the sectional structure of the means.

The charge amplification part 22 is realized, for example, with an inverting amplifier shown in FIG. 13(a) and in a structure shown in FIG. 13(b). The drain D of a charge coupled element part 23 and the source S of a load MOS part 24 as connected to the drain are commonly made a region 9 which has the opposite conductivity type to that of a substrate. Thus, they can be constituted as in FIG. 13(b).

Numeral 25 indicates an externally applied voltage terminal, while characters $V_D$ designate an externally applied voltage.

Figure 14A:
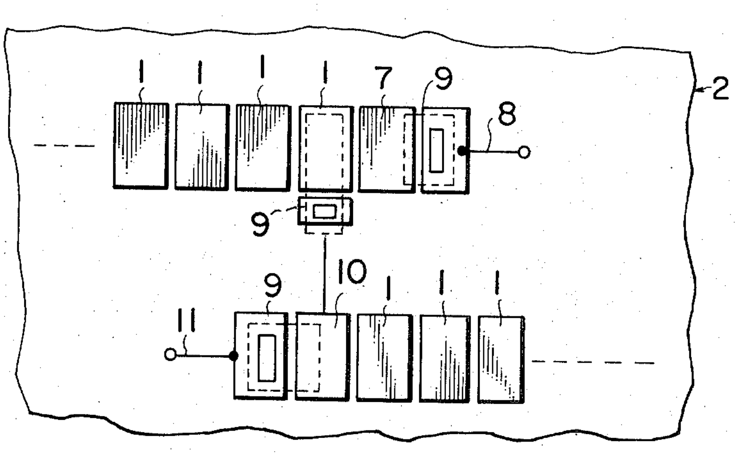
Figure 14B:
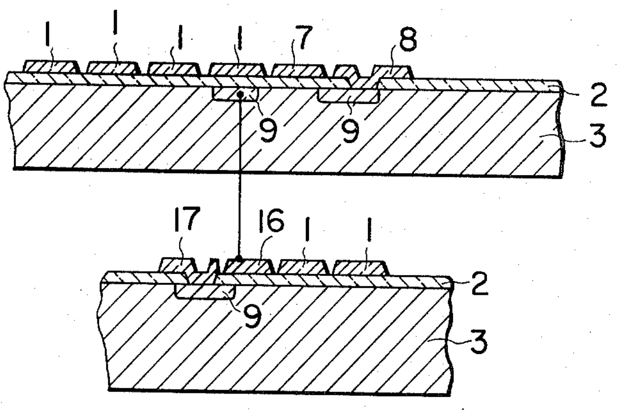
FIG. 14(b) shows the sectional structure of the means.

Similarly realizable as the charge amplification part 22 is a construction in which, as shown in FIGS. 14(a) and 14(b) charges which have been shifted along the surface portion of the substrate, are detected by a region 9 being opposite in conductivity type to the substrate, and another charge coupled element is controlled by an input gate electrode 16 connected to the region 9.

Although, in all the foregoing embodiments, description has been made using the fundamental structures of the charge coupled semiconductor elements, it is apparent that the present invention is applicable to the method of shifting charges in one direction with two-phase pulses by, e.g., varying the thickness of the insulating film under the electrodes as has been previously stated, and to charge coupled semiconductor elements of other structures.

In the foregoing embodiments of the present invention, the structures of the main path and the by-path or the methods of applying moving pulses to both the paths have been described as being substantially the same. In other words, description has been made such that when the main path is impressed with three phase pulses, the by-path is also impressed with three-phase pulses. In the case of realizing the technical idea of the present invention, however, such construction is not necessarily so limited, but it is also possible to adopt the three-phase pulse system for the main path and the two-phase pulse system for the by-path.

In this case, it is desired that the shift electrodes of the main path and those of the by-path are individually applied with three-phase and two-phase pulses.

We claim:

1. A charge coupled semiconductor element comprising:

a semiconductor substrate of a first conductivity type;

an insulating film disposed on one surface of said substrate;

first means, coupled to said substrate, for injecting charges of a polarity opposing said first conductivity type into a portion of the surface of said substrate;

a first electrode disposed on said insulating film, adjacent said first means;

means for applying an input gate signal to said first electrode for transferring injected charges thereunder;

a predetermined number of electrodes provided on said insulating film to which shift pulses are applied, disposed next to said first electrode;

second means for applying multiple phase voltage pulses to respective ones of said predetermined number of electrodes to effect the sequential transfer of charges therebeneath;

third means, coupled to said substrate, for deriving signals corresponding to charges which have been injected into said substrate and transported along the substrate surface portion beneath said predetermined number of electrodes by said second means;

an output gate electrode, disposed adjacent said third means and said predetermined number of electrodes but being separated from said first electrode by said predetermined number of electrodes;

means for applying an output gate signal to said output gate electrode for effecting the transfer of charges, which have been sequentially transferred beneath said predetermined number of electrodes, to said third means; and fourth means, coupled to said third means, for substantially eliminating noise component charges generated by the shifting of charges beneath said predetermined number of electrodes and said output gate electrode from the signals derived by said third means, comprising:

an array of electrodes made up of a selected number of spaced apart electrodes disposed on said insulating film apart from said predetermined number of electrodes and respectively positioned opposite the last *n* number of electrodes of said predetermined number of electrodes, adjacent said output gate electrode, where *n* corresponds to the number of said multiple phase voltage pulses, an additional electrode, disposed on said insulating film but being spaced apart from and at a position opposite said output gate electrode, additional means, coupled to said substrate adjacent said additional electrode and spaced apart from and at a position opposite said third means, for deriving signals corresponding to noise component charges which have been transported along the substrate surface portion beneath said array of electrode and said additional electrode, means for electrically connecting said additional electrode to said output gate electrode, means for electrically connecting said selected number of electrodes respectively to said last *n* number of said predetermined number of electrodes, and means, connected to additional means and to said third means, for differentially combining the signals derived thereby, so as to substantially cancel said noise component charges from the signals derived by said third means.

2. A charge coupled semiconductor element according to claim 1, which further including means, disposed between said last *n* number of electrodes and said array of electrodes, and between said output gate electrode and said additional electrode, for preventing the charges of said electrodes from flowing into each other.

3. A charge coupled semiconductor element according to claim 2, wherein said preventing means comprises a separation zone provided between said last *n* number of electrodes and said array of electrodes, and between said output gate electrode and said additional electrode.

4. A charge coupled semiconductor element according to claim 3, wherein said separation zone is composed of an insulating film layer, which is thicker than said insulating film under said last *n* number of electrodes, said output gate electrode, said array of electrodes and said additional electrode and which is provided on said semiconductor substrate surface between said last *n* number of electrodes and said array of electrodes, and between said output gate electrode and said additional electrode.

5. A charge coupled semiconductor element according to claim 3, wherein said separation zone is composed of an insulating film which is made of a material different from that of said insulating film under said last *n* number of electrodes, said output gate electrode, said array of electrodes and said additional electrode and which is provided on said semiconductor substrate between said last *n* number of electrodes and said array of electrodes, and between said output gate electrode and said additional electrode.

6. A charge coupled semiconductor element according to claim 3, wherein said separation zone is composed of a conductor layer which is provided on an insulating film on the semiconductor substrate interposed between said last *n* number of electrodes and said array of electrodes, and between said output gate electrode and said additional electrode.

* * * * *